United States Patent Office 3,093,033
Patented June 11, 1963

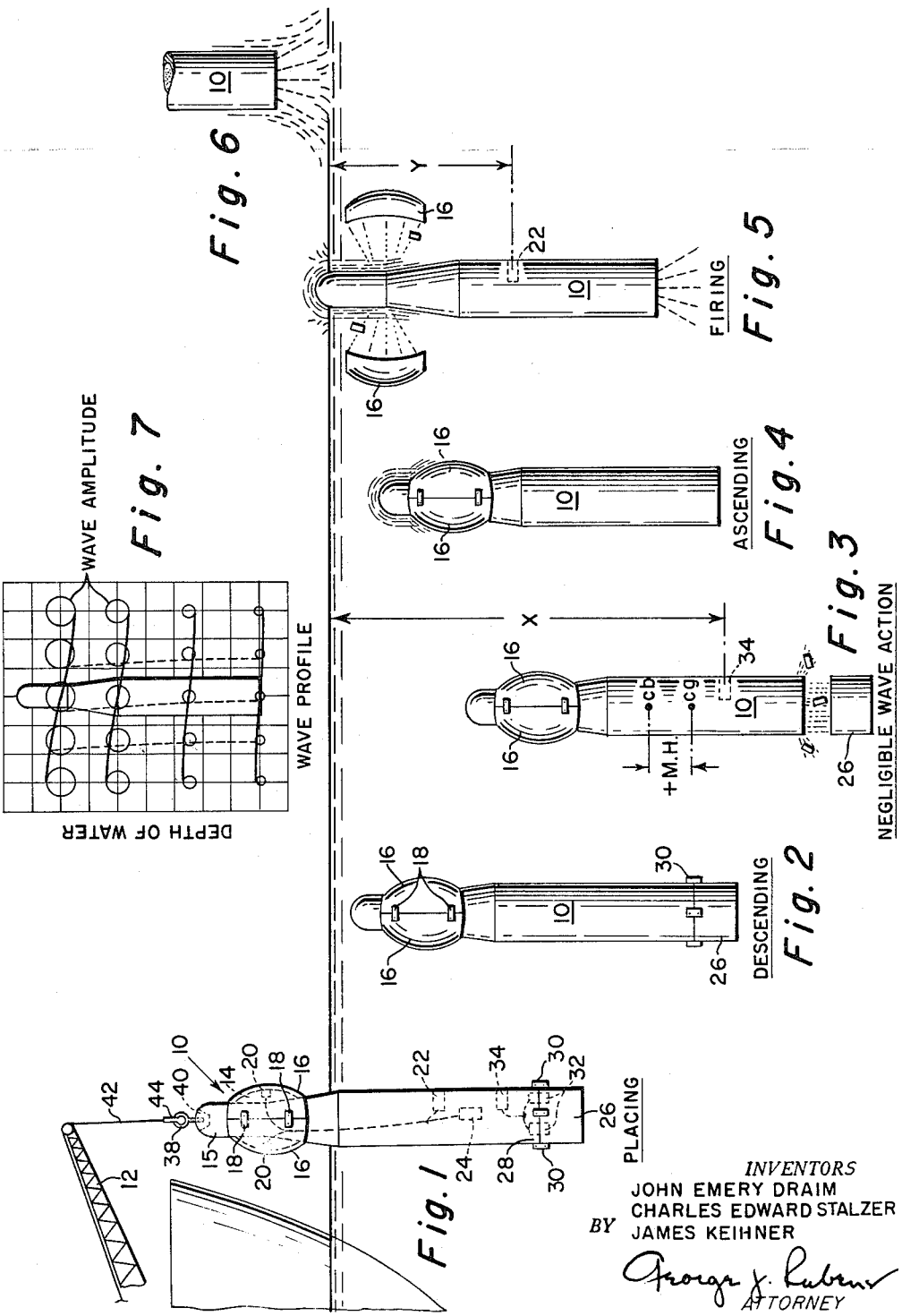

3,093,033
DESCENDING-ASCENDING WATER-LAUNCHED
ROCKET VEHICLE
John Emery Draim, Oxnard, Charles Edward Stalzer,
Camarillo, and James Keihner, NAS, Point Mugu,
Calif., assignors to the United States of America as
represented by the Secretary of the Navy
Filed Nov. 30, 1960, Ser. No. 72,807
2 Claims. (Cl. 89—1.7)
(Granted under Title 35, U.S. Code (1952), sec. 266)

The invention described herein may be manufactured and used by or for the Government of the United States of America for governmental purposes without the payment of any royalties thereon or therefor.

The present invention relates to a descending-ascending water-launched rocket vehicle, and more particularly to a rocket vehicle which is lowered to a predetermined depth in a body of water, raised toward the surface of the water and fired while it is rising.

The present method of launching large payloads into earth-centered orbits or deep-spaced missions is from a land-based facility which requires expensive support equipment costing three to five times as much as a rocket vehicle itself. The present invention eliminates equipment such as fuel and oxidizer storage facilities, cryogenic systems, concrete launching pads, large steel gantries and armoured blockhouses by providing a rocket vehicle which can be launched from water. The seas enable 70 percent of the earth's surface to become a potential launch site since the rocket vehicle can be towed or carried literally anywhere therein as described in a copending U.S. patent application, Serial No. 31,243, now U.S. Patent 3,074,321, filed by John Emery Draim and Charles E. Stalzer. Phenomenal safety is inherent in a water-launched rocket vehicle since any explosion due to a malfunctioning of the rocket vehicle will be absorbed by the surrounding water thereby eliminating injuries to personnel and eliminating replacement or repairing of support equipment. According to the invention the mass of water surrounding the sides of a water-launched rocket vehicle will act as sort of semi-rigid launch rails and ensure an initial velocity vector of the vehicle close to the vertical.

The present invention contemplates launching a rocket vehicle by lowering the vehicle in the water to a predetermined depth where the wave action is negligible, raising the rocket vehicle by buoyancy means and then firing the vehicle while it is rising in the water. For a complete description of a rocket vehicle which is floated with a positive metacentric height, reference is made to a copending U.S. patent application, Serial No. 27,459, now U.S. Patent 3,077,143, filed by John Emery Draim and Charles E. Stalzer. The latter application discloses a method of launching a rocket vehicle at the surface of the water. Since wave action is at a maximum at the surface of the water, it is apparent that such a method will subject the rocket vehicle to maximum wave forces. These forces will cause a maximum instability of the rocket vehicle by rolling and heaving the vehicle from a local vertical and of course these forces will exert a maximum strain on the vehicle's structure. The present invention minimizes the instability and stresses due to wave motion at the surface of the water by lowering the vehicle to a sufficient depth within the water where wave action is negligible. When the wave length is very small compared with the depth, which is typical of most locations at sea, the wave motion diminishes rapidly from the surface downwards. Thus at a depth equal to a wave length the diminution of wave amplitude is $e^{-2\pi}$ or $1/535$ of the amplitude of the wave at the surface. ("Hydrodynamics," page 366, by Sir Horace Lamb, Dover Press, 1945.) In FIG. 7, there is shown a wave profile of a trochoidal ocean wave for a wave length of 500', a wave height of 20', a water depth of 1,000' and a state 6 sea (winds of 40 knots). The profile characterizes wave motion as a series of circular motion which rapidly decreases exponentially with increasing depth. Since the wave decay with increasing depth is exponential, it is apparent that a rocket vehicle near the surface of the water will be subjected to maximum rolling moments because of the differential in forces between the nose end and a base end of the vehicle. By lowering the vehicle in the water to a sufficient depth, it is also apparent that the differential of these forces is negligible and that the vehicle will have perfect stability for all intents and purposes. In a preferred embodiment, the present invention launches a rocket vehicle floated with a positive metacentric height by weighting a base end of the vehicle to submerge it to a predetermined depth where wave action is negligible, releasing the weight at this depth thus allowing the vehicle to rise in the water because of buoyancy means and then firing the vehicle while it is so rising. The rocket vehicle will be perfectly stable for all intents and purposes at the predetermined depth, and upon releasing the weight at the base of the vehicle at this depth it will rise with a progressively increasing vertical velocity toward the surface of the water. It is then apparent that the over-all launching stability of the rocket vehicle is greatly improved since it will be subjected to a minimum wave action by spending a relatively short period of time at or near the surface of the water.

An object of the present invention is to provide a rocket vehicle which can be launched from a body of water with improved stability.

Another object is to provide a method of launching a rocket vehicle from a body of water with improved stability.

A further object is to provide a simplified method of launching a large rocket vehicle.

Other objects and many of the attendant advantages of this invention will be readily apparent as the disclosure is made in the following detailed description of a preferred embodiment of the invention as illustrated in the accompanying sheets of drawings in which:

FIG. 1 is a side view of a ship placing a rocket vehicle into a body of water.

FIG. 2 is a side view of the rocket vehicle descending in the water.

FIG. 3 is a side view of the vehicle at a predetermined depth.

FIG. 4 is a side view of the rocket vehicle ascending in the water.

FIG. 5 is a side view of the rocket vehicle being fired at a predetermined time.

FIG. 6 is a side view of the rocket vehicle commencing its journey into space.

FIG. 7 is a wave profile of a trochoidal ocean wave.

Referring now to the drawings wherein like reference numerals designate like or corresponding parts throughout the several views, there is shown in FIG. 1 a ship placing a rocket vehicle 10 into a body of water with a large crane 12. Assuming that the rocket vehicle originally had a specific gravity equal to or greater than one with respect to the body of water, a predetermined amount of buoyant material 14, such as cork, will be mounted in strips on the rocket vehicle above its center of gravity so as to make it floatable with a positive metacentric height; that is, the center of buoyancy will lie between the center of gravity and a nose end 15 of the vehicle, such as shown in FIG. 4. The buoyant material 14 is mounted on the rocket vehicle by jacket halves 16 which are secured together by frangible flaps 18 located in pairs on both sides of the vehicle. Embedded in the buoyant material 14 are explosive squibs 20 which the electrically connected to a hydrostatic actuator 22 and an igniter 24. The hydrostatic actuator 22 is designed to operate at depth Y as shown in FIG. 5 at which time an electrical current is sent to igniter 24 and the explosive squibs 20. The igniter 24 then ignites a rocket motor (not shown) and the explosive squibs 20 force the jacket halves 16 away from the rocket vehicle breaking the frangible flaps 18 and thereby allowing the strips of buoyant material 14 to fall away from the rocket vehicle. While in the preferred embodiment the rocket motor is ignited at the same time the buoyant material is jettisoned, it is to be understood that they can be operated separately at different depths by using two hydrostatic actuators, one actuator for each operation. A weight 26 having a specific gravity greater than one, and preferably lead, is mounted at the base end 28 of the rocket vehicle by frangible flaps 30 so as to establish the rocket vehicle with the buoyant material 14 at a specific gravity greater than one with respect to the water. It is to be noted that this will increase the metacentric height in a positive direction such as shown in FIG. 2. Explosive squibs 32 are electrically connected to a hydrostatic actuator 34, the latter being operated at depth X where the rocket vehicle has descended to a predetermined depth as shown in FIG. 3. Upon operation of the hydrostatic actuator 34, an electrical current is sent to the explosive squibs 32 causing them to explode downwardly against the weight 26 thereby breaking the frangible flaps 30 and allowing the weight 26 to part from the vehicle 10. At the nose end 15 of the rocket vehicle an eyebolt 38 is threaded into a plug 40 and a cable 42 having a swivel joint 44 is attached at one end to the crane 12 and at the other end to the eyebolt 38.

Referring to FIG. 1, the ship, located at a predetermined launch site, is placing the rocket vehicle with the buoyant material 14 and the weight 26 into the body of water. After it is sufficiently placed by the ship, the eyebolt is unscrewed from the plug 40 thereby allowing the rocket vehicle 10 to be free in the water. Since the rocket vehicle with the buoyant material 14 and the weight 26 is heavier than the water and has a positive metacentric height, it will upon being released from the ship descend in a substantially upright position as shown in FIG. 2. Upon descending in the water to a predetermined depth where the wave action is negligible for launch purposes the hydrostatic actuator 34 operates the explosive squibs 32 to part the weight 26 from the vehicle 10. Upon this parting the rocket vehicle with the buoyant material 14 is floatable, still maintaining a positive metacentric height as explained above. Accordingly, the rocket vehicle will then commence to ascend in a substantially upright position toward the surface of the water as shown in FIG. 4. When the nose 36 of the vehicle breaks the surface as shown in FIG. 5 the hydrostatic actuator 22 operates the explosive squibs 20 and the igniter 24 thereby severing the buoyant material 14 from the rocket vehicle and starting the rocket motor. Under propulsion of the rocket motor the rocket vehicle leaves the water and commences its travel into space as shown in FIG. 6.

It is to be understood that while the buoyant material 14 was mounted on a rocket vehicle having an original specific gravity greater than one in order to make it floatable with a positive metacentric height it is within the spirit of the invention to design the rocket vehicle to be inherently floatable with a positive metacentric height such as by providing an internal void at a proper location within the vehicle 10, the latter being fully described in the U.S. patent application, Serial No. 27,459, now U.S. Patent 3,077,143. It is also to be understood that the degree of buoyancy to be given to the rocket vehicle by the buoyant material 14 is to be in accordance with the roughness of the body of water. Accordingly, if wave action is severe near the surface of the water, the rocket vehicle will be designed with a lesser specific gravity by adding more buoyant material 14 so as to give the vehicle a greater upward velocity through the depths having undesirable wave action. If the amount of buoyant material 14 is increased so as to lessen the specific gravity of the rocket vehicle it is to be noted that the metacentric height will be increased thereby giving additional stability to the rocket vehicle while it traverses the depths having undesirable wave action.

It is now readily apparent that the present invention provides a new method of launching a rocket vehicle from water by descending the vehicle to a depth where wave action is negligible for launching purposes then raising the vehicle by buoyancy means toward the surface of the water so that it will traverse depths having undesirable wave motion with an upward velocity.

We claim:

1. An apparatus comprising a vehicle launchable into air from a body of water which has surface wave motion that effects upward stability of the vehicle when the vehicle is water borne near said surface, float means attached to said vehicle capable of floating the combination of the vehicle and said float means in the water, weight means attached to the vehicle capable of sinking the combination of the vehicle, the float means and the weight means in the water, means for releasing the weight means from the vehicle when the vehicle has been sunk in the water to a minimum predetermined depth between the surface and the bottom of the water where the stability of the vehicle is substantially unaffected by wave motion thereby allowing the combination of the vehicle and buoyant means to ascend in the water, means for releasing the buoyancy means while the vehicle is ascending so as to minimize the load on the vehicle after launch, and, means for firing the vehicle while it is ascending whereby the effect of wave motion on the vehicle at the time of firing is minimized.

2. An apparatus comprising a rocket vehicle launchable into air from a body of water whch has surface wave motion that effects upward stability of the vehicle when the vehicle is water borne near said surface, said vehicle having a nose end and a rocket exhaust nozzle end, a buoyant member attached to and jacketing the exterior of the vehicle, said member being located between vehicle's center of gravity and said nose end so that the path of exhaust gases from said nozzle are unrestricted by said member, said buoyant member being capable of exerting a buoyant force sufficient to float the combination of the vehicle and the buoyant member in the water with the vehicle in a substantially upright position, weight means attached at the nozzle end of the vehicle and extending directly therebelow, said weight means being sufficient to cause the combination of the vehicle, the buoyant member and the weight means to sink in the water, means for releasing the weight means when the apparatus has reached a minimum predetermined depth between the surface and the bottom of the water where wave motion in the water does not materially effect the stability of the vehicle whereby upon releasing the weight means the buoyant member will cause the vehicle to ascend dynamically in the water in a substantially upright position, means responsive to a firing mechanism of the vehicle for releasing the buoyant member from the vehicle simultaneously with the firing of the vehicle while the vehicle is ascending in the water whereby the buoyant member is jettisoned after firing and the effect of the wave motion on the stability of the vehicle is minimized by first establishing the vehicle in a substantially stable condition at said predetermined depth and then firing the vehicle while it is in a dynamically ascending condition.

(References on following page)

References Cited in the file of this patent

UNITED STATES PATENTS

| | | |
|---|---|---|
| 1,707,112 | Browne | Mar. 26, 1929 |
| 2,818,807 | Tracey | Jan. 7, 1958 |
| 2,989,899 | Siegel et al. | June 27, 1961 |

FOREIGN PATENTS

| | | |
|---|---|---|
| 1,110,465 | France | Oct. 12, 1955 |

OTHER REFERENCES

Missiles and Rockets, January 1957, pages 18 and 19, Break-up in Army-Navy Jupiter Program, by Erik Berganst.